US009247443B2

(12) United States Patent
Gao et al.

(10) Patent No.: US 9,247,443 B2
(45) Date of Patent: Jan. 26, 2016

(54) METHOD AND APPARATUS FOR USE IN DETECTING CHANGES WITHIN WIRELESS SIGNAL ENVIRONMENT

(71) Applicant: QUALCOMM Incorporated, San Diego, CA (US)

(72) Inventors: Weihua Gao, San Jose, CA (US); Saumitra Mohan Das, Santa Clara, CA (US); Sai Pradeep Venkatraman, Santa Clara, CA (US); Ju-Yong Do, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 13/951,271

(22) Filed: Jul. 25, 2013

(65) Prior Publication Data

US 2015/0031307 A1 Jan. 29, 2015

(51) Int. Cl.
*H04B 17/00* (2015.01)
*H04W 24/10* (2009.01)
*H04W 24/08* (2009.01)
*H04L 12/26* (2006.01)

(52) U.S. Cl.
CPC ............. *H04W 24/10* (2013.01); *H04L 43/16* (2013.01); *H04W 24/08* (2013.01)

(58) Field of Classification Search
CPC ....... H04W 24/08; H04W 24/10; H04L 43/16
USPC ................................... 455/67.11, 67.14, 67.7
See application file for complete search history.

(56) References Cited

U.S. PATENT DOCUMENTS

| 7,856,209 | B1 | 12/2010 | Rawat |
| 2006/0003773 | A1* | 1/2006 | Miyata et al. .............. 455/452.2 |
| 2007/0087761 | A1 | 4/2007 | Anjum et al. |
| 2011/0039580 | A1 | 2/2011 | Wigren et al. |
| 2012/0157089 | A1* | 6/2012 | Yang et al. .................... 455/424 |
| 2012/0184302 | A1 | 7/2012 | Kazmi et al. |
| 2013/0079033 | A1 | 3/2013 | Gupta et al. |

FOREIGN PATENT DOCUMENTS

WO 2013044137 3/2013

OTHER PUBLICATIONS

Chang N., et al., "Differential Access Points for Indoor Location Estimation," IEEE International Conference on Electro/Information Technology, 2009, pp. 256-259.
International Search Report and Written Opinion—PCT/US2014/046449—ISA/EPO—Nov. 6, 2014.

* cited by examiner

Primary Examiner — Ayodeji Ayotunde
(74) Attorney, Agent, or Firm — Berkeley Law & Technology Group, LLP (57) ABSTRACT

Various methods, apparatuses and articles of manufacture are provided for use by one or more electronic devices to detect and/or respond to certain changes (anomalies) within a wireless signaling environment. For example, a first electronic device may receive a report of a threshold anomaly detected by a monitoring device deployed at a fixed predetermined position within a coverage area of a network service device, and may initiate an investigation by requesting that a second electronic device attempt to monitor certain transmissions of and/or actively communicate with a network service device. In response to a determination based, at least in part, on the investigation that the threshold anomaly represents a threshold change in status within the wireless signaling environment, the first electronic device may transmit a status report regarding the wireless signaling environment to another electronic device.

84 Claims, 6 Drawing Sheets

```
┌─────────────────────────────────────────┐
│ Receive a report indicative of a threshold │
│ anomaly within a wireless signaling      │
│ environment having been detected by a    │
│ monitoring device deployed at a fixed    │
│ predetermined position within a coverage │
│ area of a network service device         │
└─────────────────────────────────────────┘
                                      ─ 202
                    ▼
┌─────────────────────────────────────────┐
│ Initiate an investigation of at least one of the threshold │
│ anomaly and/or the network service device by │
│ transmitting a message to a second electronic device │
│ requesting that the second electronic device attempt to │
│ monitor transmissions from the network service device │
│ and/or actively communicate with the network service │
│ device                                   │
└─────────────────────────────────────────┘
                                      ─ 204
                    ▼
┌─────────────────────────────────────────┐
│ In response to a determination based, at least in part, │
│ on the investigation that the threshold anomaly │
│ represents a threshold change in status within the │
│ wireless signaling environment, transmit a status report │
│ regarding the wireless signaling environment to another │
│ electronic device                        │
└─────────────────────────────────────────┘
                                      ─ 206
```

METHOD AND APPARATUS FOR USE IN DETECTING CHANGES WITHIN WIRELESS SIGNAL ENVIRONMENT

BACKGROUND

1. Field

The subject matter disclosed herein relates to electronic devices, and more particularly to methods, apparatuses and articles of manufacture for use by one or more electronic devices to detect and/or respond to certain anomalies and/or certain changes within a wireless signaling environment.

2. Information

As its name implies, a mobile station may be moved about, e.g. typically being carried by a user and/or possibly a machine. By way of some non-limiting examples, a mobile station may take the form of a cellular telephone, a smart phone, a tablet computer, a laptop computer, a wearable computer, a navigation and/or tracking device, etc.

A mobile station may allow for a wide variety of wireless communication capabilities and services. For example, a mobile station may allow a user to make telephone calls, send and receive emails, attended video teleconferences, access other devices, download and playback content, surf the Internet, etc. A plethora of different types of network access devices may be provided to support such activities. For example, various cellular base stations, femto cell and/or pico cell devices, and/or other like service area extenders/repeaters may be provided. For example, various access point devices, Wi-Fi hotspots, and/or the like may be provided to support various types of wireless area networks.

In addition to providing various communication capabilities, mobile station may also be configured to support various positioning/navigation capabilities. For example, a position and/or movements of a mobile station may be determined, at least in part, by a positioning and/or navigation capability (herein after simply referred to as a positioning capability) that may be implemented on board the mobile station, in one or more other electronic devices, and/or some combination thereof. Certain positioning capabilities may be based on one or more wireless signals transmitted by one or more transmitting devices and acquired by mobile station. By way of example, certain wireless signal-based positioning capabilities make use of wireless signals acquired from a satellite positioning system (SPS), such as, e.g., the global positioning system (GPS), etc. In another example, certain wireless signal-based positioning capabilities make use of wireless signals acquired from terrestrial-based wireless transmitting devices, such as, e.g., a dedicated positioning Beacon transmitting device, an access point (AP) which may be part of a wireless local area network, a base transceiver station which may be part of the cellular telephone system, and/or the like or some combination thereof. In certain implementations, a positioning capability may make use of one or more electronic files, such as, e.g., an electronic map, a routability graph, a radio heatmap, and/or the like or some combination thereof, to determine a position and/or other movements of the mobile station within a particular environment.

Accordingly with all of these important capabilities, it may be beneficial to monitor and understand how the various electronic devices are behaving (operating) and/or hence possibly serving one another within a wireless signaling environment. One way to monitor such electronic devices is to receive information regarding the experiences that such devices undergo. For example, a mobile device may gather information about its experience operating effectively or ineffectively with one or more other devices. Such information may be subsequently shared and analyzed, e.g., to possibly determine how well a system/network is performing. However, in certain situations, the gathering of such performance data in this manner may prove inefficient, slow, possibly prohibited, incomplete, expensive, etc.

SUMMARY

In accordance with certain aspects, an example method is provided which may be implemented at a first electronic device. The method may comprise: receiving a report indicative of a threshold anomaly within a wireless signaling environment having been detected by a monitoring device deployed at a fixed predetermined position within a coverage area of a network service device; initiating an investigation of at least one of the threshold anomaly and/or the network service device by transmitting a message to a second electronic device requesting that the second electronic device attempt to monitor transmissions from the network service device and/or actively communicate with the network service device; and in response to a determination based, at least in part, on the investigation that the threshold anomaly represents a threshold change in status within the wireless signaling environment, transmitting a status report regarding the wireless signaling environment to another electronic device.

In accordance with certain aspects, an example apparatus for use at a first electronic device may comprise: means for receiving a report indicative of a threshold anomaly within a wireless signaling environment having been detected by a monitoring device deployed at a fixed predetermined position within a coverage area of a network service device; means for initiating an investigation of at least one of the threshold anomaly and/or the network service device by transmitting a message to a second electronic device requesting that the second electronic device attempt to monitor transmissions from the network service device and/or actively communicate with the network service device; and means for concluding the investigation by transmitting a status report regarding the wireless signaling environment to another electronic device, in response to a determination based, at least in part, on the investigation that the threshold anomaly represents a threshold change in status within the wireless signaling environment.

In accordance with certain aspects, an example electronic device may comprise: a communication interface; and a processing unit coupled to the communication interface and configured to: obtain a report via the communication interface, the report being indicative of a threshold anomaly within a wireless signaling environment having been detected by a monitoring device deployed at a fixed predetermined position within a coverage area of a network service device; initiate an investigation of at least one of the threshold anomaly and/or the network service device by sending a message via the communication interface to a second electronic device requesting that the second electronic device attempt to monitor transmissions from the network service device and/or actively communicate with the network service device; and in response to a determination based, at least in part, on the investigation that the threshold anomaly represents a threshold change in status within the wireless signaling environment, initiate transmission of a status report regarding the wireless signaling environment to another electronic device via the communication interface.

In accordance with certain aspects, an example article of manufacture may comprise a non-transitory computer readable medium having stored therein computer implementable instructions executable by a processing unit of a first electronic device to: obtain a report indicative of a threshold anomaly within a wireless signaling environment having been detected by a monitoring device deployed at a fixed predetermined position within a coverage area of a network service device; initiate an investigation of at least one of the threshold anomaly and/or the network service device by transmitting a message to a second electronic device requesting that the second electronic device attempt to monitor transmissions from the network service device and/or actively communicate with the network service device; and in response to a determination based, at least in part, on the investigation that the threshold anomaly represents a threshold change in status within the wireless signaling environment, initiate transmission of a status report regarding the wireless signaling environment to another electronic device.

In accordance with certain aspects, an example method is provided which may be implemented at a monitoring device deployed at a fixed predetermined position within a coverage area of a network service device. The method may comprise: detecting a threshold anomaly within a wireless signaling environment at the fixed predetermined position by passively monitoring wireless signal transmissions within the wireless signaling environment; in response to detecting the threshold anomaly: transmitting a report indicative of the threshold anomaly to an electronic device, attempting to subsequently actively communicate with the network service device, and preparing feedback for transmission to the electronic device indicative of a result of the attempt to subsequently actively communicate with the network service device.

In accordance with certain aspects, an example apparatus for use in a monitoring device deployed at a fixed predetermined position within a coverage area of a network service device may comprise: means for detecting a threshold anomaly within a wireless signaling environment at the fixed predetermined position by passively monitoring wireless signal transmissions within the wireless signaling environment; and in response to detecting the threshold anomaly: means for transmitting a report indicative of the threshold anomaly to an electronic device, means for attempting to subsequently actively communicate with the network service device, and means for preparing feedback for transmission to the electronic device indicative of a result of the attempt to subsequently actively communicate with the network service device.

In accordance with certain aspects, an example monitoring device may comprise: a communication interface; and a processing unit coupled to the communication interface and configured to: detect a threshold anomaly within a wireless signaling environment at a fixed predetermined position of the monitoring device within a coverage area of a network service device through the passive monitoring of wireless signal transmissions within the wireless signaling environment; and in response to detecting the threshold anomaly: initiate transmission of a report indicative of the threshold anomaly to an electronic device via the communication interface, attempt to subsequently actively communicate with the network service device via the communication interface, and prepare feedback for transmission to the electronic device indicative of a result of the attempt to subsequently actively communicate with the network service device.

In accordance with certain aspects, an example article of manufacture may comprise a non-transitory computer readable medium having stored therein computer implementable instructions executable by a processing unit of a monitoring device to: detect a threshold anomaly within a wireless signaling environment at the fixed predetermined position by passively monitoring wireless signal transmissions within the wireless signaling environment; and in response to detecting the threshold anomaly: initiate transmission of a report indicative of the threshold anomaly to an electronic device, attempt to subsequently actively communicate with the network service device, and prepare feedback for transmission to the electronic device indicative of a result of the attempt to subsequently actively communicate with the network service device.

BRIEF DESCRIPTION OF DRAWINGS

Non-limiting and non-exhaustive aspects are described with reference to the following figures, wherein like reference numerals refer to like parts throughout the various figures unless otherwise specified.

DETAILED DESCRIPTION

Various techniques are described herein which may be implemented in one or more electronic devices to at least assist with detecting certain anomalies within a wireless signaling environment, possibly initiating an investigation and/or supporting such investigation in response to one or more anomalies being detected, and determining (e.g., based at least in part, on the investigation) whether certain changes have occurred within a wireless signaling environment. An anomaly may represent a significant change within a wireless signaling environment. In certain implementations, certain detectable changes within a wireless signaling environment may be determined to be significant, and hence represent an anomaly, based, at least in part, on one or more threshold comparisons, and/or the like. For example, various signal characteristics/parameters may be measured and compared to one or more applicable threshold ranges and/or values. For example, a presence of a different signal (e.g., possibly new), or a loss/absence of an expected signal may be detected based, at least in part on a comparison of an applicable threshold list of signals/transmitters and/or the like associated with a wireless signaling environment. In certain examples, such a threshold list may indicate specific transmitting devices (e.g., by unique identifier, SSID, etc.), and/or may indicate one or more threshold ranges or values regarding numbers of one or more types of transmitting devices (e.g., expected, allowed, minimum, maximum, per vender, etc.).

Accordingly, in certain instances, an anomaly may, for example, occur and be detected based, at least in part, on acquiring signals from one or more new or different transmitting devices (e.g., which may be part of a newly deployed network). Indeed, in certain instances, a specific anomaly detection may consider whether the transmitting devices may be identified (e.g., based on unique identifiers, SSID, etc.) as possibly corresponding to a particular vendor, service provider, and/or other like entity.

These are but a few examples of anomalies (e.g., a threshold anomalies) that may detected, and hence claimed subject matter is not necessarily intended to be so limited.

In certain example implementations, in response to a determination that certain changes in status within a wireless signaling environment have occurred, one or more status reports may be provided to one or more electronic devices which may operate in some manner based on one or more wireless signals received and/or transmitted within the wireless signaling environment. For example, a status report may be transmitted to one or more electronic devices associated with a service provider, and/or other like possibly interested entity. For example, in response to receiving a status report, an additional investigation (e.g., into a potential problem, etc.) may be initiated.

In certain instances, status report may simply indicate that an anomaly has been detected. Hence, for example, a status report may take the form of an indicator (e.g., flag, value, field, etc.), may be provided in one or more messages (e.g., in a body of the message, a header of the message, or elsewhere) to indicate an anomaly. In certain example implementations, such an indicator may be further indicative of one or more anomalies. In certain example implementations, such an indicator may be provided as part of a specific message(s), and/or possibly as part of one or more messages having other related or unrelated purposes. In certain instances, a status report may take the form of a telephone call, an electronic mail, a tweet, and/or the like, which may be received and applicably processed by a person and/or machine. In certain instances, a status report may vary in its form, transmission time(s), recipient(s), etc., depending on the type(s) of anomaly(ies) being reported.

Figure 1:
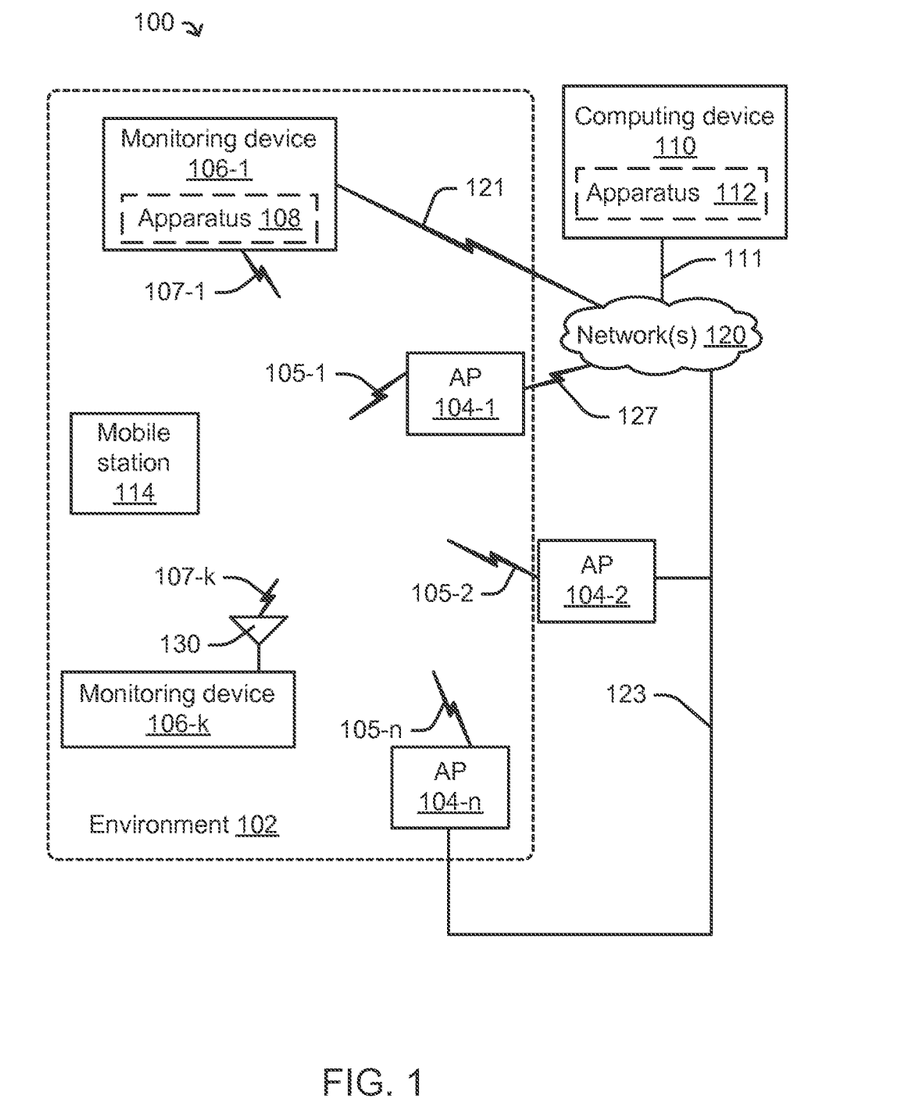
FIG. 1 is a schematic block diagram illustrating an arrangement of representative electronic devices including one or more electronic devices to detect and/or respond to certain anomalies and/or certain changes within a wireless signaling environment, in accordance with an example implementation.

Attention is drawn to FIG. 1, which is a schematic block diagram illustrating an arrangement 100 of representative electronic devices and an applicable wireless signaling environment 102. In certain instances, wireless signaling environment 102 may comprise all or part of one or more indoor environments, e.g., within one or more structures. Thus, by way of example, wireless signaling environment 102 may represent all or part of a building, a campus, an arena, a shopping mall, an airport, etc.

As shown, one or more network service devices (represented by access points (APs)) is may be provisioned within and/or possibly nearby wireless signaling environment 102 to provide or support certain services to one or more other electronic devices that may be present at times with wireless signaling environment 102. By way of example, AP 104-1, AP 104-2 . . . AP 104-$n$ are illustrated in arrangement 100, with AP 104-2 being illustrated as being provisioned outside of wireless signaling environment 102. AP 104-1 may transmit and/or receive one or more wireless signals within at least a portion of wireless signaling environment 102 as represented by communication link 105-1. AP 104-1 may also communicate with one or more other electronic devices, represented here by network(s) 120 over one or more wired and/or wireless communication links represented by communication link 127. As further shown, AP 104-2 and AP 104-$n$ may also transmit and/or receive one or more wireless signals within at least a portion of wireless signaling environment 102 as represented by communication links 105-2 and 105-$n$, respectively. Additionally, as shown AP 104-2 and AP 104-$n$ may also communicate with network(s) 120 over one or more wired and/or wireless communication links represented by shared communication link 123.

In addition to providing wireless signaling supporting communication, it should also be understood that in certain example implementations one or more network service devices (represented by the APs in arrangement 100) may transmit wireless signals which may be used for location estimation and/or other like positioning/navigation and/or location based services, e.g., applicable to one or more mobile stations 114. Hence, in certain instances, a network service device may support communication with a particular communication network/system and also location estimation. However in certain other instances, some network service devices may not necessarily support communication with particular communication network/system, but instead support location estimation. Thus, for example in certain instances, one or more of the APs and arrangement 100 may represent a location Beacon transmitting device and/or the like.

While illustrated similarly, it should be understood that two or more of AP 104-1, AP 104-2, . . . AP 104-$n$ may represent different types of network service devices. Further, it should be understood that AP 104-1, AP 104-2, . . . AP 104-$n$ may be provisioned as part of one or more wireless communication networks/systems. Thus, in certain instances: AP 104-1 may represent an access point device and/or the like provisioned as part of a wireless local area network (WLAN) and/or the like; and, AP 104-2 may represent a base station, repeater, and/or the like provisioned as part of a cellular network and/or the like; wherein, the WLAN and/or cellular network may be capable of providing access to an intranet, the Internet, etc. As may be appreciated, such network service devices may be configured to provide and/or otherwise support various communication capabilities within wireless signaling environment 102. By way of example, one or more network service devices may be configured to provide and/or otherwise support wireless communication involving one or more mobile stations 114. By way of example, AP 104-1 may receive one or more messages from mobile station 114 and/or transmit one or more messages to mobile station 114 through communication link 105-1. By way of example, AP 104-1 may further receive one or more messages via network(s) 120 and/or transmit one or more messages via network(s) 120 through communication link 127. As illustrated, network(s) 120 may be coupled via one or more wired and/or wireless communication links 110 to one or more electronic devices, e.g., illustrated here by computing device 110. It should be recognized that in certain instances, communication may be provided and/or supported between computing device 110 and one or more of the representative electronic devices illustrated within wireless signaling environment 102. Hence, for example, mobile station 114 may communicate with computing device 110 through communication link 105-1, AP 104-1, communication link 127, network(s) 120, and communication link 111. In another example, a monitoring device 106-1 may communicate with computing device 110 through a (wireless) communication link 121, network(s) 120, and communication link 111. Although not illustrated, in certain instances, a monitoring device 106-1 may additionally and/or alternatively communicate with computing device 110 through a (wireless) communication link 107-1 via one or more of the APs. Likewise, in certain instances, monitoring device 106-1 may communicate with one or more other electronic devices through communication link 107-1.

While computing device 110 and network(s) 120 are illustrated in arrangement 100 as being provisioned outside of wireless signaling environment 102, it should be understood that in certain implementations all or part of computing device 110 and/or network(s) 120 may be provisioned within wireless signaling environment 102. Similarly, while representative monitoring devices 106-1 through 106-*k* are illustrated within arrangement 100 as being provisioned within wireless signaling environment 102, it should be understood that in certain implementations all or part of such monitoring devices may be provisioned outside but near wireless signaling environment 102.

As described in greater detail herein, various techniques may be implemented wherein one or more monitoring devices may be provided to detect certain anomalies, e.g., threshold anomalies, within a wireless signaling environment 102. By way of an initial example, monitoring device 106-1 may be deployed at a fixed pre-determined position within a coverage area of at least one of the network service devices within wireless signaling environment 102. Monitoring device 106-1 may, for example, comprise a communication interface capable of receiving and transmitting wireless signals, e.g., via indication links 107-1 and/or 121.

As illustrated, monitoring device 106-1 may comprise an apparatus 108 which may be configured to detect one or more threshold anomalies in one or more wireless signals corresponding to one or more of the APs 104 within wireless signaling environment 102. For example, in certain instances, apparatus 108 while operating in a passive (e.g., "listening") mode and/or an active (e.g., transmitting) mode may detect a threshold anomaly within wireless signaling environment 102 based, at least in part, on one or more signal strength measurement values (e.g., a received signal strength indicator (RSSI), etc.) for one or more wireless signals transmitted by a network service device as received at monitoring device 106-1. In another example, in certain instances, apparatus 108 while operating in a passive mode and/or an active mode may detect a threshold anomaly within wireless signaling environment 102 based, at least in part, on one or more measured propagation times (e.g., time of flight (TOF), etc.) and/or one or more corresponding distance measurements of one or more wireless signal transmitted by a network service device. In yet another example, in certain instances, apparatus 108 while operating in an active mode may detect a threshold anomaly within wireless signaling environment 102 based, at least in part, on one or more measured propagation times (e.g., round trip time (RTT), etc.) and/or a corresponding distance measurement of one or more wireless signal transmitted between monitoring device 106-1 and a network service device.

In certain example implementations, monitoring device 106-1 may detect a threshold anomaly by comparing one or more of such measured characteristics with one or more expected signal characteristics for at least an applicable portion of wireless signaling environment 102 and/or a coverage area of a particular network service device. In certain instances, such an expected signal characteristic may be pre-determined and/or otherwise provided to the monitoring device. In certain instances, such an expected signal characteristic may be indicative of one or more applicable threshold ranges and/or values, etc., from which anomalous behavior may be detected. As may be appreciated, in certain instances, an expected signal characteristic may be based on actual and/or simulated wireless signaling information. Thus, for example, in certain instances, one or more modeling functions may be applied to characterize wireless signaling environment 102 and/or a coverage area of a particular network service device with regard to the predetermined position of a particular monitoring device. In certain instances, some modeling functions may use simulated measurements corresponding to wireless signal transmission/reception. In certain instances, some modeling functions may use actual measurements corresponding actual wireless signal transmission/reception. Such modeling functions and/or other like communication characterization techniques are well known and beyond the scope of the present description. It should however, be understood that such capabilities may be provided via one or more electronic devices within arrangement 100.

As illustrated using monitoring device 106-*k*, in certain implementations a monitoring device may comprise an antenna 130 that may be configurable in some manner. By way of example, in certain implementations, antenna 130 may be adaptable, steerable and/or otherwise configurable in some manner to selectively affect transmission and/or reception of one or more wireless signals. Hence, in certain instances a monitoring device may be responsive to one or more recommended transmitters settings and/or one or more recommended receiver settings. For example, as described in greater detail herein, in certain implementations a status report may be received by monitoring device from computing device 110 which is indicative of one or more one or more recommended transmitter and/or receiver settings, which may been determined as a result of investigating a previously reported threshold anomaly. Accordingly, a monitoring device may be updated by computing device 110 from time to time based on certain investigations corresponding to reported threshold anomalies and/or possibly threshold changes in the status of wireless signaling environment 102. Indeed, in certain instances, a status report from computing device 110 may be indicative of one or more updated expected signal characteristics and/or certain criterion that may be used by monitoring device, e.g., and in detecting subsequent threshold anomalies within wireless signaling environment 102.

Network(s) 120 is intended to represent all or part of one or more other electronic devices and/or communication facilities and/or resources capable of supporting wired and/or wireless electronic communication. Thus for example, network(s) 120 may comprise all or part of a telephone network, a cellular telephone network, a wireless communication network, an intranet, the Internet, and/or the like or some combination thereof.

Figure 2A:
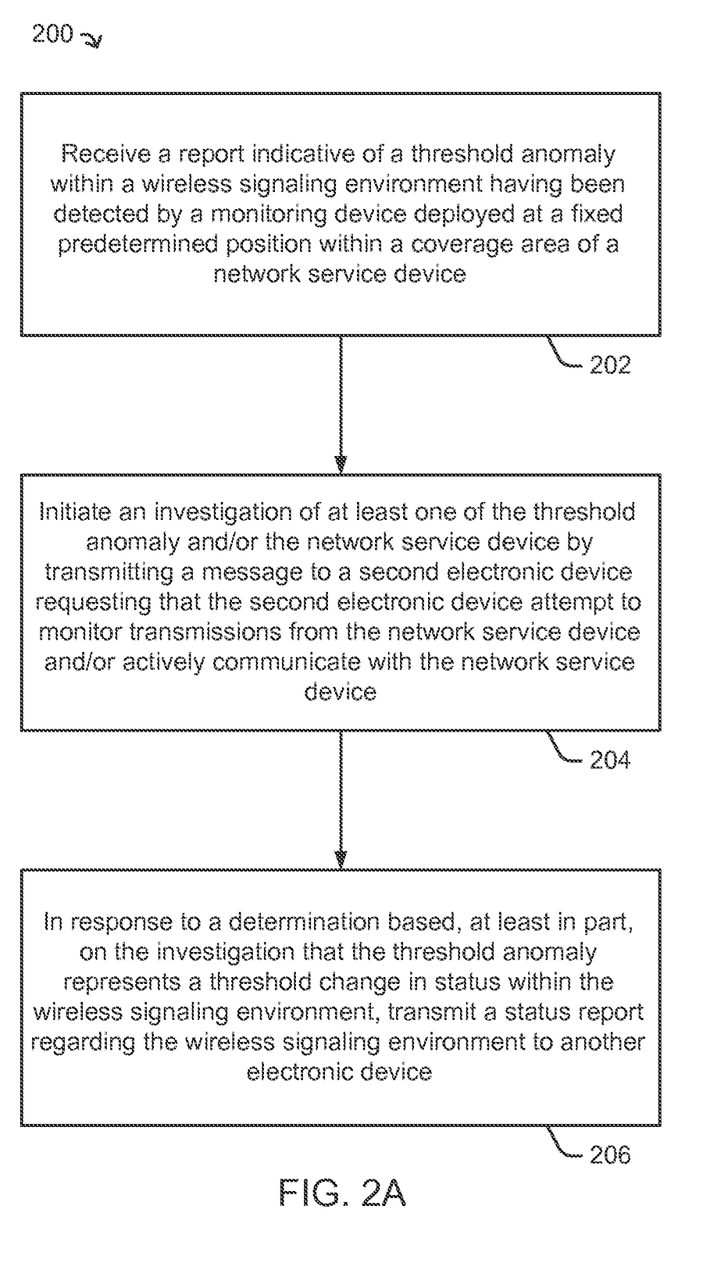
FIG. 2A and FIG. 2B are flow diagrams illustrating example processes that may be implemented in one or more electronic devices to investigate and determine whether a threshold change in a status has occurred within a wireless signaling environment following one or more reports from one or more deployed (electronic) monitoring devices indicating detection of certain threshold anomalies within the wireless signaling environment, in accordance with certain example implementations.

Attention is drawn next to FIG. 2A, which is a flow diagram illustrating example process 200 that may be implemented in computing device 110 and/or apparatus 112 (FIG. 1) to investigate and determine whether a threshold change in a status has occurred within a wireless signaling environment.

At example block 202, one or more reports indicative of one or more threshold anomalies having been detected by one or more monitoring devices within a wireless signaling environment may be received, e.g., by computing device 110. In accordance with certain example implementations, a monitoring device may be deployed at a fixed predetermined position, e.g., within a coverage area (e.g., expected and/or actual) of at least one network service device. Accordingly, in certain instances, a report of a threshold anomaly may be indicative of a particular network service device and/or a particular wireless signal corresponding to such network service device. Thus, for example, a report from a monitoring device may identify a unique identifier and/or the like of a network service device, and/or a unique identifier and/or the like of a wireless signal indicative of a particular network service device.

As mentioned in previous examples, a monitoring device may detect a threshold anomaly based on some characteristic of a wireless signal which may be compared to an expected characteristic, etc. Thus, by way of example, a monitoring device may detect a threshold anomaly based, at least in part, on loss/absence of a particular wireless signal, and/or some other measurable characteristic which may exceed a threshold value/range, threshold model/function, some other threshold-based criterion, and/or the like or some combination thereof. For example, in certain instances, a threshold value/range corresponding to a signal power change may indicate that an anomaly is present when a signal power changes by more than a certain particular unit-based value (e.g., RSSI, dBm, mw, nw, etc.) more than a percentage (e.g., 20%, 50%, etc.) of an expected, nominal, and/or reference level. For example, in certain instances, a threshold value/range corresponding to a number of transmitting devices may apply to one or more types of transmitting devices (e.g., by operation, vendor, service provider, etc.) and/or a number or range of such transmitting devices (e.g., expected, maximum, minimum, etc.).

Those skilled in the art should recognize that a plethora of signal characteristic-based tests and/or comparisons may be applied to assist in detecting a threshold anomaly. Further, it should be understood that, while in certain threshold anomaly detections may be instantly recognizable (e.g., a loss or substantial degradation in a wireless signal), and other instances, a threshold anomaly detection process may extend over a period of time, and may include the application of certain statistical and/or other like techniques.

At example block 204, an investigation of at least one of the threshold anomalies and/or said network service devices (e.g., as reported at block 202) may be initiated, e.g., by computing device 110. Here, for example, computing device 110 may transmit one or more messages to one or more other electronic devices (e.g., at least a "second electronic device") requesting that the one or more other electronic devices attempt to monitor transmissions from a network service device and/or actively communicate with such network service device. By way of example, in certain instances, such a "second electronic device" may comprise a monitoring device reporting the threshold anomaly, and/or one or more other monitoring devices. Thus, for example, if a first monitoring device reports a threshold anomaly with regard to a particular network service device, it may be beneficial for computing device 110 as part of an investigation to request (assign) that a second monitoring device attempt to passively and/or actively monitor the particular network service device and/or a wireless signal associated there with. For example, with reference back to FIG. 1, let us assume that a first monitoring device 106-1 reports a threshold anomaly corresponding to AP 104-1 to computing device 110. Computing device 110 may transmit a message to monitoring device 106-k requesting that monitoring device 106-k attempt to monitor transmissions from AP 104-1. To support the investigation initiated by computing device 110, monitoring device 106-k may subsequently passively listen for wireless signals from AP 104-1 over communication link 105-1, and/or possibly actively transmit wireless signals to from AP 104-1 over communication link 105-1. As part of such an investigation, monitoring device 106-K may transmit feedback regarding its attempt(s) to monitor the transmissions and/or communicate with AP 104-1.

In certain instances, feedback may simply indicate a confirmation or lack thereof of a particular threshold anomaly. Hence, for example, certain feedback may take the form of an indicator (e.g., flag, value, field, etc.), may be provided in one or more messages (e.g., in a body of the message, a header of the message, or elsewhere) to indicate confirmation or lack thereof. In certain example implementations, such an indicator may be further indicative of additional data/information corresponding to the confirmation, and/or possibly one or more other threshold anomalies. In certain example implementations, such an indicator may be provided as part of a specific message(s), and/or possibly as part of one or more messages having other related or unrelated purposes.

Consequently, with feedback from one or more other electronic devices, computing device 110 may determine whether a reported threshold anomaly may or may not represent and/or otherwise correspond to a threshold change in status within the wireless signal environment. In making such a decision, computing device 110 may, for example, apply a true/false threshold-based analysis based on feedback obtained, and/or may apply other more complex types of analyses.

At example block 206, in response to a determination based, at least in part, on the investigation that a reported threshold anomaly represents a threshold change in status within the wireless signaling environment, a status report regarding the wireless signaling environment may be transmitted to at least one electronic device. Thus, for example, one or more status reports may be transmitted to one more network service devices, one or more monitoring device, one or more mobile stations, and/or one or more computing devices. In certain instances, an example status report may be indicative of an expected signal characteristic (e.g., being updated, revised, temporary affected, newly identified, etc.) within at least a portion of the wireless signaling environment. By way of example, a status report may be indicative of a new or changed wireless signal parameter, model, function, heatmap (e.g., RSSI, RTT, etc.), and/or the like. Indeed, in certain instances an example status report may comprise of positioning assistance data, e.g., for use by a mobile station to facilitate and/or enable location determination services.

In certain example implementations, a status report may be indicative of a recommended transmitter setting for use within at least a portion of the wireless signaling environment. Hence, a recommended transmitter setting may provide certain hints that may be of use to certain electronic devices which may attempt to transmit wireless signals to a particular network service device. By way of some non-limiting examples, a recommended transmitter setting may be indicative of a recommended transmit power level setting, a recommended channel setting, a recommended frequency band, a recommended transmission time, a recommended protocol setting, a recommended antenna setting, and/or the like or some combination thereof.

In certain example implementations, a status report may be indicative of a recommended receiver setting for use within at least a portion of the wireless signaling environment. Hence, a recommended receiver setting may provide certain hints that may be of use to certain electronic devices which may attempt to receive wireless signals from a particular network service device. By way of some non-limiting examples, a recommended receiver setting may be indicative of a recommended receiver gain setting, a recommended channel setting, a recommended frequency band, a recommended reception time, a recommended protocol setting, a recommended antenna setting, and/or the like or some combination thereof.

In certain example implementations, a status report resulting from an investigation may be indicative of a criterion and/or the like, e.g., which may be applied by a monitoring device in detecting a subsequent threshold anomaly within the wireless signaling environment. Thus, for example, a status report may provide a capability to adjust or otherwise affect certain threshold-based factors that may be applied in detecting threshold anomalies. As such, status reports may assist in tuning monitoring devices when applicable.

For at least these reasons and others, as may be appreciated, in certain instances, a status report may be indicative of very specific information, e.g., intended for a particular recipient device, service, process, function, etc. However, in other instances, a status report may serve a plurality of different purposes and/or recipient devices, etc.

In certain further instances, a status report may be provided to one or more electronic devices capable of alerting one or more service providers, entities, machines, persons, etc., e.g., regarding the presence or absence of a particular threshold anomaly, threshold change in status within a wireless signaling environment, a potential problem with one or more electronic devices, a potential correction of a problem with one or more electronic devices, etc.

Figure 2B:
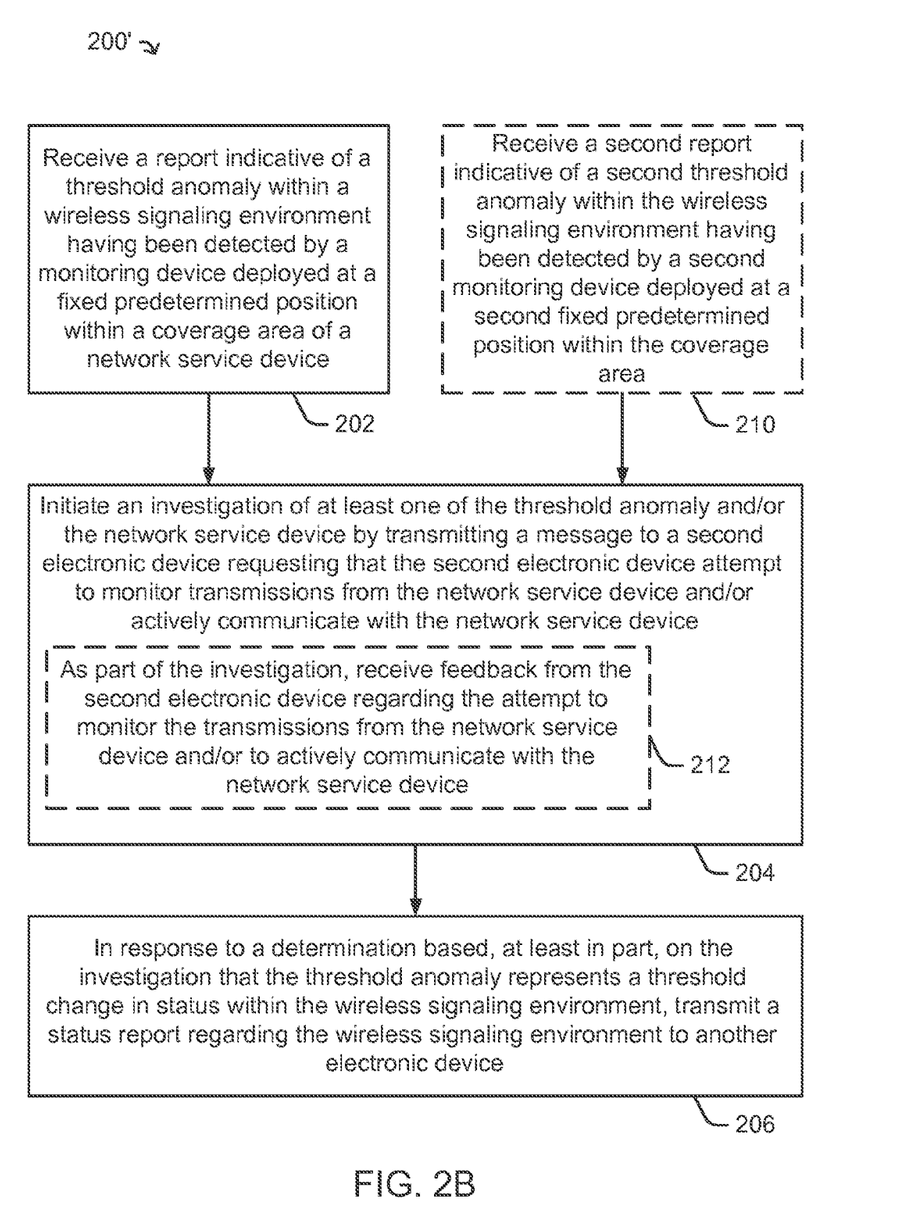

Attention is drawn next to FIG. 2B, which is a similar flow diagram illustrating example process 200' that may be implemented in computing device 110 and/or apparatus 112 (FIG. 1) to investigate and determine whether a threshold change in a status has occurred within a wireless signaling environment.

Example process 200' comprises example blocks 202, 204, and 206, e.g., as described above in process 200 (FIG. 2A), with some additional example modifications/enhancements.

More specifically, example block 204 illustrates through example block 212 that, as part of an investigation, feedback may be received from a second electronic device regarding an attempt to monitor transmissions from a network service device and/or to actively communicate with such network service device. As mentioned, example block 212 may in certain implementations allow computing device 110 and/or apparatus 112 to obtain additional information regarding a particular network service device and/or wireless signaling environment 102, which may inform its determination as to whether or not a threshold change in status within the wireless signaling environment as occurred, and/or provide additional support in preparing certain status reports (e.g., at block 206).

Process 200' also includes an example block 210, which illustrates that a second report indicative of a second threshold anomaly within a wireless signaling environment may be received, e.g., from a second monitoring device deployed at a second fixed predetermined position. Accordingly, in certain implementations, as may be appreciated, at block 204, an investigation of at least one of the reported threshold anomalies and/or one of the applicable network service devices may be initiated based on a plurality of reports. Thus, for example, while in certain instances it may be desirable to initiate an investigation based on a single report of a threshold anomaly detection, and certain other instances it may be desirable to initiate an investigation in response to two or more reported threshold anomaly detections. Indeed, in certain instances certain threshold anomaly detections reported by certain monitoring devices may be considered to be more or less accurate than others, and therefore their respective influence/weight may vary.

Figure 3A:
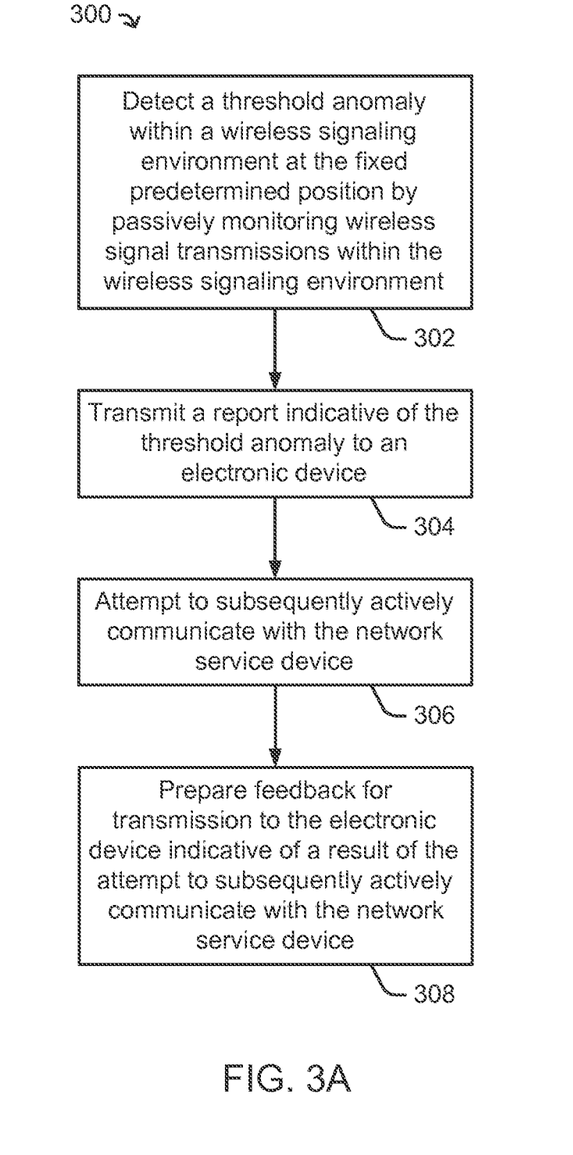
FIG. 3A and FIG. 3B are flow diagrams illustrating example processes that may be implemented in one or more (electronic) monitoring devices that may be deployed within a wireless signaling environment to detect one or more threshold anomalies within the wireless signaling environment, in accordance with certain example implementations.

Attention is drawn next to FIG. 3A, which is a flow diagram illustrating example process 300 that may be implemented in monitoring device 106-1 and/or apparatus 108 (FIG. 1) to detect and report one or more threshold anomalies within wireless signaling environment 102, and possibly to assist in an investigation of a threshold anomaly, e.g., in support of a determine as to whether a threshold change in a status may or may not have occurred within a wireless signaling environment.

At example block 302, a threshold anomaly may be detected within a wireless signaling environment at the fixed predetermined position of a monitoring device based, at least in part, on passively monitoring wireless signal transmissions within the wireless signaling environment. Several examples of such activities have been previously described.

At example block 304, a report indicative of a threshold anomaly may be transmitted to at least one electronic device. By way of example, with reference to FIG. 1, monitoring device 106-1 and/or apparatus 108 provisioned therein may transmit at least one report to computing device 110 and/or arrangement 112 provisioned therein.

At example block 306, an attempt may be made to actively communicate with the network service device corresponding to the detected threshold anomaly. By way of example, monitoring device 106-1 having detected a threshold anomaly while monitoring wireless signals transmitted by AP 104-1 over communication link 105-1, may transmit one or more wireless signals over communication link 107-1 in an attempt to probe or otherwise attempt to establish communication with AP 104-1. In certain example implementations, an attempt to communicate in accordance with example block 306 may be initiated independently by monitoring device 106-1 and/or apparatus 108. In certain example implementations, an attempt to communicate in accordance with example block 306 may be initiated in response to receiving one or more messages requesting such as part of an investigation, e.g., from computing device 110 (see also, example block 204 in process 200 of FIG. 2A).

At example block 308, feedback indicative of a result of the attempt to actively communicate with the network service device (e.g., as per example block 306), may be prepared for possible transmission to another electronic device. Thus, for example, in certain instances, feedback prepared at block 308 may be stored in memory. In certain instances, such feedback may be beneficial to the monitoring device and future attempts to indicate with the network service device and/or in detecting a future threshold anomaly. Indeed, in certain instances, feedback prepared at block 308 may indicate that the threshold anomaly detected at block 302 and reported that block 304, may or may no longer be considered valid by the monitoring device.

Figure 3B:
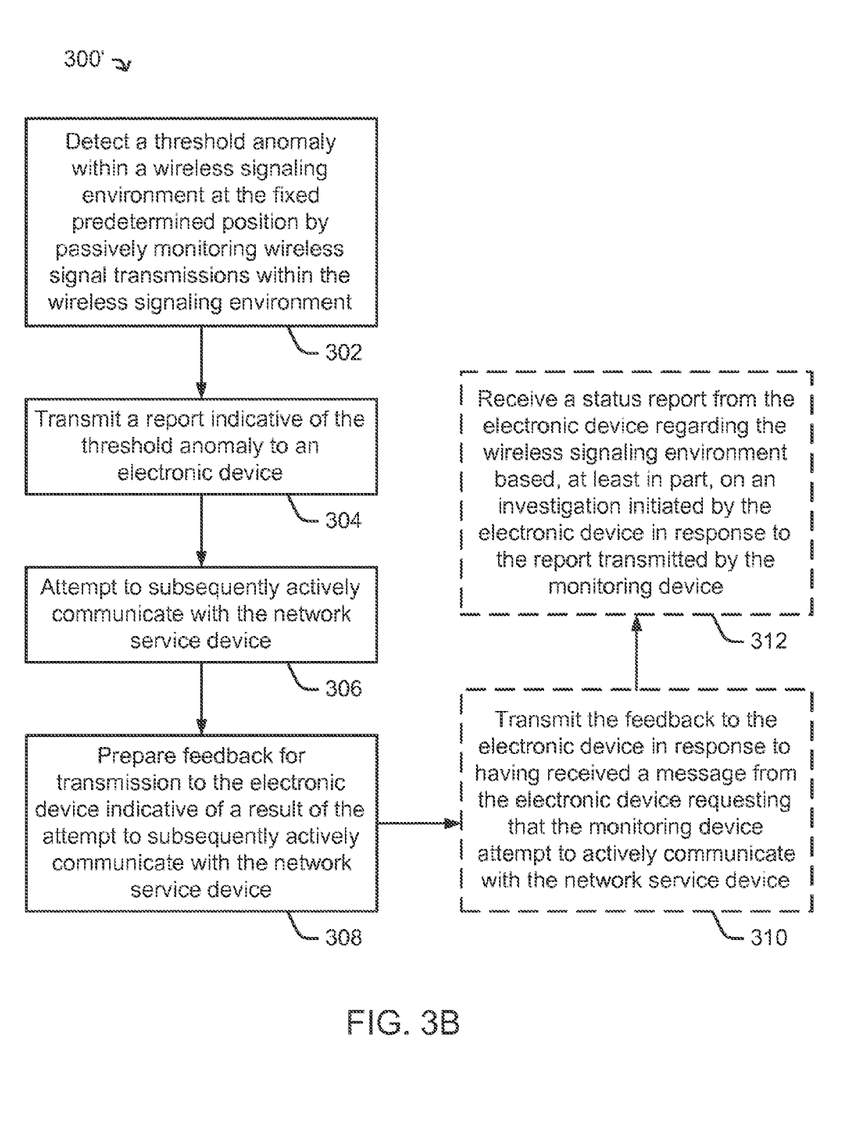

Attention is drawn next to FIG. 3B, which is a similar flow diagram illustrating example process 300' that may be implemented in monitoring device 106-1 and/or apparatus 108 (FIG. 1) to detect and report one or more threshold anomalies within wireless signaling environment 102, and possibly to assist in an investigation of a threshold anomaly, e.g., in support of a determine as to whether a threshold change in a status may or may not have occurred within a wireless signaling environment.

Example process 300' comprises example blocks 302, 304, 306, and 308, e.g., as described above in process 300 (FIG. 3A), with some additional example modifications/enhancements.

At example block 310, all or part of the feedback prepared at block 308, may be transmitted to at least one other electronic device, e.g., in response to having received a message from the at least one electronic device requesting that the monitoring device attempt to actively communicate with one or more particular network service devices. Thus, for example, at example block 310, monitoring device 106-1 and/or apparatus 108 may provide further support for an investigation initiated by computing device 110 and/or apparatus 112 by providing such feedback.

At example block 312, a status report may be received from at least one electronic device regarding the wireless signaling environment. As previously mentioned, such a status report may be based, at least in part, on an investigation initiated in response to a threshold anomaly, e.g., as detected at example block 302 and reported at example block 304).

In certain example implementations, an indoor area may be populated with multiple (potentially low cost) monitoring devices, e.g., which may be fixed predetermined positions for obtaining signal measurements for use in monitoring a wireless signaling environment based on certain expected signaling characteristics (e.g., which may be based at least in part on an RSSI and/or RTT heatmap, and/or the like). At the time of deployment, such monitoring devices may be installed or strategically placed at known positions based, at least in part, on particular conditions, geometries, just to provide a couple of examples.

As previously described in the various preceding examples, a monitoring device may perform periodic passive scans and active measurements. If a threshold anomaly is detected by a monitoring device, the monitoring device may report such to one or more other electronic devices. Such a monitoring device may also, in certain instances, participate and a follow-up investigation process should one be initiated.

In a particular example implementation, a plurality of monitoring devices may be deployed in an area to monitor or "listen" to transmissions of a maximum number of APs. Monitoring device placement may be based on a number APs it can hear (e.g., placed to hear certain minimum number of surrounding APs). Monitoring devices may be placed at particular locations where there may be a line of sight (LOS) channel to a maximum number of APs. In certain instances, one or more monitoring devices may be placed close to certain (possibly relatively more important) APs, e.g., APs more likely to be relied upon for indoor positioning operations, or possibly other exigent services.

Monitoring device placement may be based on a simulated heatmap of the environment, e.g. using a greedy algorithm and/or the like. Here, in a particular example implementation, a first monitoring device may be placed at a first grid point where it is likely to hear transmissions from a maximum number of APs. A second monitoring device may be placed at a second grid point that can hear the next maximum number of APs disjoint from APs that are likely to be heard by the first monitoring device placed at the first grid point. A Monitoring device may also be placed at the more important geographic location, locations with high mobile station and/or other device traffic (e.g., an entrance/exit of a building, an elevator entrance, a stairwell door, an escalator, etc.).

In another implementation, multiple new APs detected by a monitoring device may indicate deployment of a new network and the detecting monitoring device may report a threshold anomaly to at least one other electronic device. If newly detected APs are from the same vendor or have same SSID, such a threshold anomaly detection report may be transmitted with an indication of a higher confidence of deployment of a new network.

In another implementation, a significant decrease in a number of detectable APs at a point of monitoring device deployment may indicate that an existing network has changed. Also, significant changes in an AP's transmission power may indicate that such an existing network has changed. If a power adaptive AP system is deployed, changes in AP transmission power may be indicated or otherwise reported to at least one other electronic device, e.g., possibly at certain time intervals.

Figure 4:
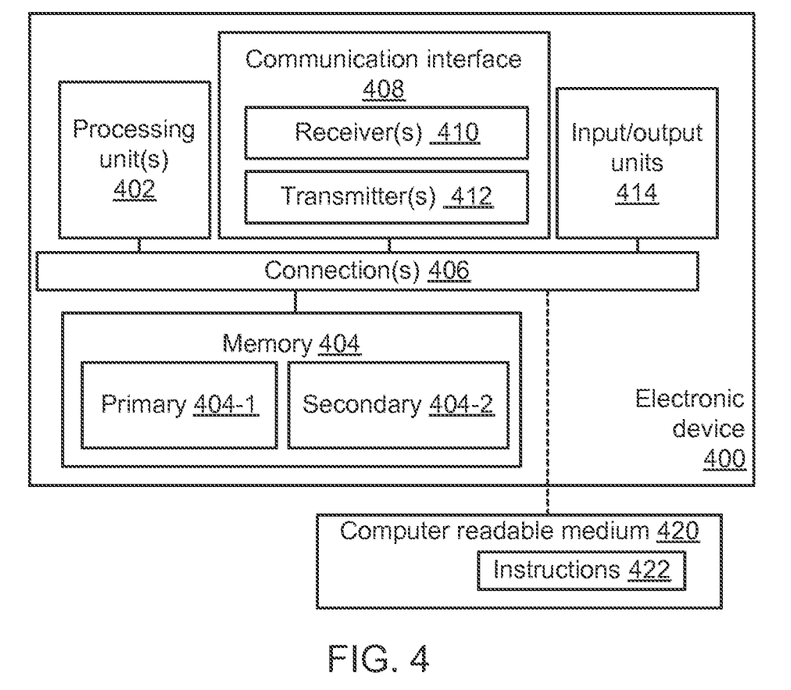
FIG. 4 is a schematic diagram illustrating certain features of an example electronic device to detect and/or respond to certain anomalies and/or certain changes within a wireless signaling environment, in accordance with certain example implementations.

Reference is made next to FIG. 4, which is a schematic diagram illustrating certain features of an example electronic device 400 to detect and/or respond to certain anomalies and/or certain changes within a wireless signaling environment, in accordance with certain example implementations.

Hence, in certain example implementations, a computing device 110 and/or apparatus 112 (FIG. 1) may comprise all or part of electronic device 400. Further, in certain example implementations, all or part of process 200 (FIG. 2A) and/or process 200' (FIG. 2B) may be implemented, at least in part, via all or part of electronic device 400.

In certain example implementations, a monitoring device 106-1 and/or apparatus 108 (FIG. 1) may comprise all or part of electronic device 400. Further, in certain example implementations, all or part of process 300 (FIG. 3A) and/or process 300' (FIG. 3B) may be implemented, at least in part, via all or part of electronic device 400.

Accordingly, electronic device 400 represents a special computing platform comprising one or more processing units 402 (e.g., to perform data processing in accordance with the techniques provided herein) coupled to memory 404 via one or more connections 406 (e.g., one or more electrical conductors, one or more electrically conductive paths, one or more buses, one or more fiber-optic paths, one or more circuits, one or more buffers, one or more transmitters, one or more receivers, etc.). Processing unit(s) 402 may, for example, be implemented in hardware or a combination of hardware and software. Processing unit(s) 402 may be representative of one or more circuits configurable to perform at least a portion of a data computing procedure or process. By way of example but not limitation, a processing unit may include one or more processors, controllers, microprocessors, microcontrollers, application specific integrated circuits, digital signal processors, programmable logic devices, field programmable gate arrays, or the like, or any combination thereof.

Memory 404 may be representative of any data storage mechanism. Memory 404 may include, for example, a primary memory 404-1 and/or a secondary memory 404-2. Primary memory 404-1 may comprise, for example, a random access memory, read only memory, etc. While illustrated in this example as being separate from the processing units, it should be understood that all or part of a primary memory may be provided within or otherwise co-located and coupled with processing unit 402 or other like circuitry within computing device 110. Secondary memory 404-2 may comprise, for example, the same or similar type of memory as primary memory and/or one or more data storage devices or systems, such as, for example, a disk drive, an optical disc drive, a tape drive, a solid motion state memory drive, etc.

In certain implementations, secondary memory may be operatively receptive of, or otherwise configurable to couple to, a non-transitory computer readable medium 420. Memory 404 and/or non-transitory computer readable medium 420 may comprise instructions 422 for use in performing data processing, e.g., in accordance with the applicable techniques as provided herein.

Electronic device 400 may, for example, further comprise one or more communication interface(s) 408. Communication interface(s) 408 may, for example, comprise one or more wired and/or wireless communication interfaces, represented here by one or more receivers 410 and one or more transmitters 412. It should be understood that in certain implementations, communication interface 408 may comprise one or more transceivers, and/or the like. Further, it should be understood that although not shown, communication interface 408 may comprise one or more antennas and/or other circuitry as may be applicable given the communication interface capability.

In accordance with certain example implementations, communication interface(s) 408 may, for example, be enabled for use with various wired communication networks, e.g., such as telephone system, a local area network, a wide area network, a personal area network, an intranet, the Internet, etc.

In accordance with certain implementations, communication interface(s) 408 may, for example, be enabled for use with various wireless communication networks such as a wireless wide area network (WWAN), a wireless local area network (WLAN), a wireless personal area network (WPAN), and so on. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMBP capability), or some other RAT. GSM and W-CDMA are described in documents from a consortium named "3rd Generation Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, for example. Wireless communication networks may include so-called next generation technologies (e.g., "4G"), such as, for example, Long Term Evolution (LTE), Advanced LTE, WiMAX, Ultra Mobile Broadband (UMB), and/or the like. Additionally, communication interface(s) 408 may further provide for infrared-based communications with one or more other devices. A WLAN may, for example, comprise an IEEE 802.11x network, and a WPAN may comprise a Bluetooth network, an IEEE 802.15x, for example. Wireless communication implementations described herein may also be used in connection with any combination of WWAN, WLAN or WPAN.

In certain instances, electronic device 400 may, for example, further comprise one or more input and/or output units 414. Input and/or output units 414 may represent one or more devices or other like mechanisms that may be used to obtain inputs from and/or provide outputs to one or more other devices and/or a user. Thus, for example, input and/or output units 414 may comprise various buttons, switches, a touch pad, a trackball, a joystick, a touch screen, a keyboard, and/or the like, which may be used to receive one or more user inputs. In certain instances, input and/or output units 414 may comprise various devices that may be used in producing a visual output, an audible output, and/or a tactile output for a user. For example, input and/or output units 414 may be used to present a video display, graphical user interface, etc., on a display mechanism.

The techniques described herein may be implemented by various means depending upon applications according to particular features and/or examples. For example, such methodologies may be implemented in hardware, firmware, and/or combinations thereof, along with software. In a hardware implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices units designed to perform the functions described herein, and/or combinations thereof.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

Some portions of the preceding detailed description have been presented in terms of algorithms or symbolic representations of operations on binary digital electronic signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated as electronic signals representing information. It has proven convenient at times, principally for reasons of common usage, to refer to such signals as bits, data, values, elements, symbols, characters, terms, numbers, numerals, information, or the like. It should be understood, however, that all of these or similar terms are to be associated with appropriate physical quantities and are merely convenient labels. Unless specifically motion stated otherwise, as apparent from the following discussion, it is appreciated that throughout this specification discussions utilizing terms such as "processing", "computing", "calculating", "determining", "generating", "obtaining", "modifying", "selecting", "identifying", and/or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device. In the context of this particular patent application, the term "specific apparatus" may include a general purpose computer once it is programmed to perform particular functions pursuant to instructions from program software.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Therefore, it is intended that claimed subject matter not be limited to the particular examples disclosed, but that such claimed subject matter may also include all aspects falling within the scope of appended claims, and equivalents thereof.

What is claimed is:

1. A method comprising, at a first electronic device:
    receiving a report indicative of a threshold anomaly within a wireless signaling environment having been detected by a monitoring device deployed at a fixed predetermined position within a coverage area of a network service device;
    initiating an investigation of at least one of said threshold anomaly and/or said network service device by transmitting a message to a second electronic device requesting that said second electronic device attempt to monitor transmissions from said network service device and/or actively communicate with said network service device; and
    in response to a determination based, at least in part, on said investigation that said threshold anomaly represents a threshold change in status within said wireless signaling environment, transmitting a status report regarding said wireless signaling environment to another electronic device.

2. The method as recited in claim 1, and further comprising, at said first electronic device:
    receiving a second report indicative of a second threshold anomaly within said wireless signaling environment having been detected by a second monitoring device deployed at a second fixed predetermined position within said coverage area.

3. The method as recited in claim 2, wherein said investigation is initiated in response to receiving at least said second report.

4. The method as recited in claim 1, and further comprising, at said first electronic device:
    as part of said investigation, receiving feedback from said second electronic device regarding said attempt to monitor said transmissions from said network service device, and/or to actively communicate with said network service device.

5. The method as recited in claim 1, wherein said second electronic device comprises said monitoring device, a second monitoring device, a mobile station, said network service device, or a second network service device, or any combination thereof.

6. The method as recited in claim 1, wherein said status report is indicative of an expected signal characteristic within at least a portion of said coverage area.

7. The method as recited in claim 1, wherein said status report comprises positioning assistance data for use by a mobile station to facilitate or enable location determination services, or a combination thereof.

8. The method as recited in claim 1, wherein said status report is indicative of a recommended transmitter setting or a recommended receiver setting for use within at least a portion of said coverage area, or a combination thereof.

9. The method as recited in claim 1, wherein said status report in indicative of a criterion for said monitoring device in detecting a subsequent threshold anomaly within said wireless signaling environment.

10. The method as recited in claim 1, wherein said at least one other device comprises said monitoring device, a second monitoring device, or a mobile station, or any combination thereof.

11. The method as recited in claim 1, wherein said another electronic device comprises one or more of: said network service device, said monitoring device, said second electronic device, a mobile station, or a computing device, or any combination thereof.

12. The method as recited in claim 1, wherein said threshold anomaly within a wireless signaling environment is based, at least in part, on a measured received signal strength of a wireless signal transmitted by said network service device as measured at said monitoring device.

13. The method as recited in claim 1, wherein said threshold anomaly within a wireless signaling environment is based, at least in part, on a measured propagation time or a corresponding distance measurement of a wireless signal transmitted between said network service device and said monitoring device, or a combination thereof.

14. The method as recited in claim 1, wherein said network service device comprises an access point (AP) device.

15. The method as recited in claim 1, wherein said fixed predetermined position is selected based, at least in part, on application of a greedy algorithm and an expected signaling characteristic within said coverage area.

16. An apparatus for use at a first electronic device, said apparatus comprising:
    means for receiving a report indicative of a threshold anomaly within a wireless signaling environment having been detected by a monitoring device deployed at a fixed predetermined position within a coverage area of a network service device;
    means for initiating an investigation of at least one of said threshold anomaly and/or said network service device by transmitting a message to a second electronic device requesting that said second electronic device attempt to monitor transmissions from said network service device and/or actively communicate with said network service device; and
    means for concluding said investigation by transmitting a status report regarding said wireless signaling environment to another electronic device, in response to a determination based, at least in part, on said investigation that said threshold anomaly represents a threshold change in status within said wireless signaling environment.

17. The apparatus as recited in claim 16, and further comprising:
    means for receiving a second report indicative of a second threshold anomaly within said wireless signaling environment having been detected by a second monitoring device deployed at a second fixed predetermined position within said coverage area.

18. The apparatus as recited in claim 17, wherein said investigation is initiated in response to receiving at least said second report.

19. The apparatus as recited in claim 16, and further comprising:
as part of said investigation, means for receiving feedback from said second electronic device regarding said attempt to monitor said transmissions from said network service device and/or to actively communicate with said network service device.

20. The apparatus as recited in claim 16, wherein said second electronic device comprises said monitoring device, a second monitoring device, a mobile station, said network service device, or a second network service device, or any combination thereof.

21. The apparatus as recited in claim 16, wherein said status report is indicative of an expected signal characteristic within at least a portion of said coverage area.

22. The apparatus as recited in claim 16, wherein said status report comprises positioning assistance data for use by a mobile station to facilitate or enable location determination services, or a combination thereof.

23. The apparatus as recited in claim 16, wherein said status report is indicative of a recommended transmitter setting or a recommended receiver setting for use within at least a portion of said coverage area, or a combination thereof.

24. The apparatus as recited in claim 16, wherein said status report in indicative of a criterion for said monitoring device in detecting a subsequent threshold anomaly within said wireless signaling environment.

25. The apparatus as recited in claim 16, wherein said at least one other device comprises said monitoring device, a second monitoring device, and/or a mobile station.

26. The apparatus as recited in claim 16, wherein said another electronic device comprises: said network service device, said monitoring device, said second electronic device, a mobile station, or a computing device, or any combination thereof.

27. The apparatus as recited in claim 16, wherein said threshold anomaly within a wireless signaling environment is based, at least in part, on a measured received signal strength of a wireless signal transmitted by said network service device as measured at said monitoring device.

28. The apparatus as recited in claim 16, wherein said threshold anomaly within a wireless signaling environment is based, at least in part, on a measured propagation time or a corresponding distance measurement of a wireless signal transmitted between said network service device and said monitoring device, or a combination thereof.

29. The apparatus as recited in claim 16, wherein said fixed predetermined position is selected based, at least in part, on application of a greedy algorithm and an expected signaling characteristic within said coverage area.

30. An electronic device comprising:
a communication interface; and
a processing unit coupled to said communication interface and configured to:
obtain a report via said communication interface, said report being indicative of a threshold anomaly within a wireless signaling environment having been detected by a monitoring device deployed at a fixed predetermined position within a coverage area of a network service device;
initiate an investigation of at least one of said threshold anomaly and/or said network service device by sending a message via said communication interface to a second electronic device requesting that said second electronic device attempt to monitor transmissions from said network service device and/or actively communicate with said network service device; and
in response to a determination based, at least in part, on said investigation that said threshold anomaly represents a threshold change in status within said wireless signaling environment, initiate transmission of a status report regarding said wireless signaling environment to another electronic device via said communication interface.

31. The electronic device as recited in claim 30, wherein said processing unit is further configured to:
obtain a second report via said communication interface, said second report being indicative of a second threshold anomaly within said wireless signaling environment having been detected by a second monitoring device deployed at a second fixed predetermined position within said coverage area.

32. The electronic device as recited in claim 31, wherein said investigation is initiated in response to receiving at least said second report.

33. The electronic device as recited in claim 30, wherein said processing unit is further configured to:
as part of said investigation, obtain feedback via said communication interface from said second electronic device regarding said attempt to monitor said transmissions from said network service device or to actively communicate with said network service device, or a combination thereof.

34. The electronic device as recited in claim 30, wherein said second electronic device comprises said monitoring device, a second monitoring device, a mobile station, said network service device, or a second network service device, or any combination thereof.

35. The electronic device as recited in claim 30, wherein said status report is indicative of an expected signal characteristic within at least a portion of said coverage area.

36. The electronic device as recited in claim 30, wherein said status report comprises positioning assistance data for use by a mobile station to facilitate or enable location determination services, or a combination thereof.

37. The electronic device as recited in claim 30, wherein said status report is indicative of a recommended transmitter setting or a recommended receiver setting for use within at least a portion of said coverage area, or a combination thereof.

38. The electronic device as recited in claim 30, wherein said status report in indicative of a criterion for said monitoring device in detecting a subsequent threshold anomaly within said wireless signaling environment.

39. The electronic device as recited in claim 30, wherein said at least one other device comprises said monitoring device, a second monitoring device, or a mobile station, or any combination thereof.

40. The electronic device as recited in claim 30, wherein said another electronic device comprises one or more of: said network service device, said monitoring device, said second electronic device, a mobile station, or a computing device, or any combination thereof.

41. The electronic device as recited in claim 30, wherein said threshold anomaly within a wireless signaling environment is based, at least in part, on a measured received signal strength of a wireless signal transmitted by said network service device as measured at said monitoring device.

42. The electronic device as recited in claim 30, wherein said threshold anomaly within a wireless signaling environment is based, at least in part, on a measured propagation time or a corresponding distance measurement of a wireless signal transmitted between said network service device and said monitoring device, or a combination thereof.

43. The electronic device as recited in claim 30, wherein said network service device comprises an access point (AP) device.

44. The electronic device as recited in claim 30, wherein said fixed predetermined position is selected based, at least in part, on application of a greedy algorithm and an expected signaling characteristic within said coverage area.

45. An article comprising:
a non-transitory computer readable medium having stored therein computer implementable instructions executable by a processing unit of a first electronic device to:
obtain a report indicative of a threshold anomaly within a wireless signaling environment having been detected by a monitoring device deployed at a fixed predetermined position within a coverage area of a network service device;
initiate an investigation of at least one of said threshold anomaly and/or said network service device by transmitting a message to a second electronic device requesting that said second electronic device attempt to monitor transmissions from said network service device and/or actively communicate with said network service device; and
in response to a determination based, at least in part, on said investigation that said threshold anomaly represents a threshold change in status within said wireless signaling environment, initiate transmission of a status report regarding said wireless signaling environment to another electronic device.

46. The article as recited in claim 45, wherein said computer implementable instructions are further executable by said processing unit to:
obtain a second report indicative of a second threshold anomaly within said wireless signaling environment having been detected by a second monitoring device deployed at a second fixed predetermined position within said coverage area.

47. The article as recited in claim 43, wherein said investigation is initiated in response to receiving at least said second report.

48. The article as recited in claim 42, wherein said computer implementable instructions are further executable by said processing unit to:
as part of said investigation, obtain feedback from said second electronic device regarding said attempt to monitor said transmissions from said network service device or to actively communicate with said network service device, or a combination thereof.

49. The article as recited in claim 42, wherein said second electronic device comprises said monitoring device, a second monitoring device, a mobile station, said network service device, or a second network service device, or any combination thereof.

50. The article as recited in claim 42, wherein said status report is indicative of an expected signal characteristic within at least a portion of said coverage area.

51. The article as recited in claim 42, wherein said status report comprises positioning assistance data for use by a mobile station to facilitate or enable location determination services, or a combination thereof.

52. The article as recited in claim 42, wherein said status report is indicative of a recommended transmitter setting or a recommended receiver setting for use within at least a portion of said coverage area, or a combination thereof.

53. The article as recited in claim 45, wherein said status report in indicative of a criterion for said monitoring device in detecting a subsequent threshold anomaly within said wireless signaling environment.

54. The article as recited in claim 45, wherein said at least one other device comprises said monitoring device, a second monitoring device, and/or a mobile station.

55. The article as recited in claim 45, wherein said another electronic device comprises one or more of: said network service device, said monitoring device, said second electronic device, a mobile station, or a computing device, or a combination thereof.

56. The article as recited in claim 45, wherein said threshold anomaly within a wireless signaling environment is based, at least in part, on a measured received signal strength of a wireless signal transmitted by said network service device as measured at said monitoring device.

57. The article as recited in claim 45, wherein said threshold anomaly within a wireless signaling environment is based, at least in part, on a measured propagation time or a corresponding distance measurement of a wireless signal transmitted between said network service device and said monitoring device, or a combination thereof.

58. The article as recited in claim 45, wherein said fixed predetermined position is selected based, at least in part, on application of a greedy algorithm and an expected signaling characteristic within said coverage area.

59. A method comprising:
at a monitoring device deployed at a fixed predetermined position within a coverage area of a network service device:
detecting a threshold anomaly within a wireless signaling environment at said fixed predetermined position by passively monitoring wireless signal transmissions within said wireless signaling environment;
in response to detecting said threshold anomaly:
transmitting a report indicative of said threshold anomaly to an electronic device,
attempting to subsequently actively communicate with said network service device, and
preparing feedback for transmission to said electronic device indicative of a result of said attempt to subsequently actively communicate with said network service device.

60. The method as recited in claim 59, and further comprising, at said monitoring device:
transmitting said feedback to said electronic device in response to having received a message from said electronic device requesting that said monitoring device attempt to actively communicate with said network service device.

61. The method as recited in claim 59, wherein said threshold anomaly within a wireless signaling environment is based, at least in part, on a measured received signal strength of a wireless signal transmitted by said network service device as measured at said monitoring device.

62. The method as recited in claim 59, wherein said threshold anomaly within a wireless signaling environment is based, at least in part, on a measured propagation time or a corresponding distance measurement of a wireless signal transmitted between said network service device and said monitoring device, or a combination thereof.

63. The method as recited in claim 59, wherein said network service device comprises an access point (AP) device.

64. The method as recited in claim 59, and further comprising, at said monitoring device:
   receiving a status report from said electronic device regarding said wireless signaling environment based, at least in part, on an investigation initiated by said electronic device in response to said report transmitted by said monitoring device, wherein said status report is indicative of:
   an expected signal characteristic within at least a portion of said coverage area;
   a recommended transmitter setting within at least a portion of said coverage area;
   a recommended receiver setting within at least a portion of said coverage area;
   a criterion for said monitoring device in detecting a subsequent threshold anomaly within said wireless signaling environment;
   positioning assistance data corresponding to location determination services within at least a portion of said coverage area, or any combination thereof.

65. The method as recited in claim 59, wherein said fixed predetermined position is based, at least in part, on application of a greedy algorithm and an expected signaling characteristic within said coverage area.

66. An apparatus for use in a monitoring device deployed at a fixed predetermined position within a coverage area of a network service device, said apparatus comprising:
   means for detecting a threshold anomaly within a wireless signaling environment at said fixed predetermined position by passively monitoring wireless signal transmissions within said wireless signaling environment; and
   in response to detecting said threshold anomaly:
      means for transmitting a report indicative of said threshold anomaly to an electronic device,
      means for attempting to subsequently actively communicate with said network service device, and
      means for preparing feedback for transmission to said electronic device indicative of a result of said attempt to subsequently actively communicate with said network service device.

67. The apparatus as recited in claim 66, and further comprising:
   means for transmitting said feedback to said electronic device in response to having received a message from said electronic device requesting that said monitoring device attempt to actively communicate with said network service device.

68. The apparatus as recited in claim 66, wherein said threshold anomaly within a wireless signaling environment is based, at least in part, on a measured received signal strength of a wireless signal transmitted by said network service device as measured at said monitoring device.

69. The apparatus as recited in claim 66, wherein said threshold anomaly within a wireless signaling environment is based, at least in part, on a measured propagation time and/or a corresponding distance measurement of a wireless signal transmitted between said network service device and said monitoring device.

70. The apparatus as recited in claim 66, and further comprising, at said monitoring device:
   receiving a status report from said electronic device regarding said wireless signaling environment based, at least in part, on an investigation initiated by said electronic device in response to said report transmitted by said monitoring device, wherein said status report is indicative of:
   an expected signal characteristic within at least a portion of said coverage area;
   a recommended transmitter setting within at least a portion of said coverage area;
   a recommended receiver setting within at least a portion of said coverage area;
   a criterion for said monitoring device in detecting a subsequent threshold anomaly within said wireless signaling environment; or
   positioning assistance data corresponding to location determination services within at least a portion of said coverage area, or any combination thereof.

71. A monitoring device comprising:
   a communication interface; and
   a processing unit coupled to said communication interface and configured to:
      detect a threshold anomaly within a wireless signaling environment at a fixed predetermined position of said monitoring device within a coverage area of a network service device through said passive monitoring of wireless signal transmissions within said wireless signaling environment; and
      in response to detecting said threshold anomaly:
         initiate transmission of a report indicative of said threshold anomaly to an electronic device via said communication interface,
         attempt to subsequently actively communicate with said network service device via said communication interface, and
         prepare feedback for transmission to said electronic device indicative of a result of said attempt to subsequently actively communicate with said network service device.

72. The monitoring device as recited in claim 71, wherein said processing unit is further configured to initiate transmission of said feedback to said electronic device via said communication interface in response to having obtained a message from said electronic device via said communication interface requesting that said monitoring device attempt to actively communicate with said network service device.

73. The monitoring device as recited in claim 71, wherein said threshold anomaly within a wireless signaling environment is based, at least in part, on a measured received signal strength of a wireless signal transmitted by said network service device as measured at said monitoring device.

74. The monitoring device as recited in claim 71, wherein said threshold anomaly within a wireless signaling environment is based, at least in part, on a measured propagation time or a corresponding distance measurement of a wireless signal transmitted between said network service device and said monitoring device, or a combination thereof.

75. The monitoring device as recited in claim 71, wherein said processing unit is further configured to:
   obtain a status report from said electronic device via said communication interface, said status report regarding said wireless signaling environment and being based, at least in part, on an investigation initiated by said electronic device in response to said report transmitted by said monitoring device, wherein said status report is indicative of:
   an expected signal characteristic within at least a portion of said coverage area;
   a recommended transmitter setting within at least a portion of said coverage area;
   a recommended receiver setting within at least a portion of said coverage area;

a criterion for said monitoring device in detecting a subsequent threshold anomaly within said wireless signaling environment; or positioning assistance data corresponding to location determination services within at least a portion of said coverage area, or any combination thereof.

76. An article comprising:

a non-transitory computer readable medium having stored therein computer implementable instructions executable by a processing unit of a monitoring device to:

detect a threshold anomaly within a wireless signaling environment at said fixed predetermined position by passively monitoring wireless signal transmissions within said wireless signaling environment; and in response to detecting said threshold anomaly:
    initiate transmission of a report indicative of said threshold anomaly to an electronic device,
    attempt to subsequently actively communicate with said network service device, and
    prepare feedback for transmission to said electronic device indicative of a result of said attempt to subsequently actively communicate with said network service device.

77. The article as recited in claim 76, wherein said computer implementable instructions are further executable by said processing unit to:

initiate transmission of said feedback to said electronic device in response to having received a message from said electronic device requesting that said monitoring device attempt to actively communicate with said network service device.

78. The article as recited in claim 76, wherein said threshold anomaly within a wireless signaling environment is based, at least in part, on a measured received signal strength of a wireless signal transmitted by said network service device as measured at said monitoring device.

79. The article as recited in claim 76, wherein said threshold anomaly within a wireless signaling environment is based, at least in part, on a measured propagation time or a corresponding distance measurement of a wireless signal transmitted between said network service device and said monitoring device, or a combination thereof.

80. The article as recited in claim 76, wherein said computer implementable instructions are further executable by said processing unit to:

receive a status report from said electronic device regarding said wireless signaling environment based, at least in part, on an investigation initiated by said electronic device in response to said report transmitted by said monitoring device, wherein said status report is indicative of one or more of:

an expected signal characteristic within at least a portion of said coverage area;

a recommended transmitter setting within at least a portion of said coverage area;

a recommended receiver setting within at least a portion of said coverage area;

a criterion for said monitoring device in detecting a subsequent threshold anomaly within said wireless signaling environment; or positioning assistance data corresponding to location determination services within at least a portion of said coverage area, or any combination thereof.

81. The method as recited in claim 1, wherein said fixed predetermined position is selected based, at least in part, at a location where a largest amount of access points may be monitored.

82. The apparatus as recited in claim 17, wherein said fixed predetermined position is selected based, at least in part, at a location where a largest amount of access points may be monitored.

83. The electronic device as recited in claim 30, wherein said fixed predetermined position is selected based, at least in part, at a location where a largest amount of access points may be monitored.

84. The article as recited in claim 45, wherein said fixed predetermined position is selected based, at least in part, at a location where a largest amount of access points may be monitored.

\* \* \* \* \*